(12) United States Patent
Aymard et al.

(10) Patent No.: US 12,152,110 B2
(45) Date of Patent: Nov. 26, 2024

(54) LIGNOCELLULOSIC BIOMASS TREATMENT METHOD

(71) Applicants: IFP Energies Nouvelles, Rueil-Malmaison (FR); Institut National de Recherche Pour L'Agriculture, L'Alimentation et L'Environment, Paris (FR); Agro Industries Recherche Et Developpement, Pomacle (FR)

(72) Inventors: Caroline Aymard, Lyons (FR); Pierre-Antoine Bouillon, Lyons (FR); Meriem Bouras, Ste Foy les Lyon (FR)

(73) Assignees: IFP Energies Nouvelles, Rueil-Malmaison (FR); Institut National de Recherche Pour L'Agriculture, L'Alimentation et L'Environment, Paris (FR); Agro Industries Recherche Et Developpement, Pomacle (FR)

( * ) Notice: Subject to any disclaimer, the term of this patent is extended or adjusted under 35 U.S.C. 154(b) by 172 days.

(21) Appl. No.: 16/956,143

(22) PCT Filed: Dec. 4, 2018

(86) PCT No.: PCT/EP2018/083542
§ 371 (c)(1),
(2) Date: Jun. 19, 2020

(87) PCT Pub. No.: WO2019/120996
PCT Pub. Date: Jun. 27, 2019

(65) Prior Publication Data
US 2020/0339761 A1   Oct. 29, 2020

(30) Foreign Application Priority Data
Dec. 20, 2017 (FR) ..................... 1762609

(51) Int. Cl.
*C08H 8/00* (2010.01)
*B01J 8/00* (2006.01)
(Continued)

(52) U.S. Cl.
CPC ................ *C08H 8/00* (2013.01); *B01J 8/001* (2013.01); *B01J 8/0045* (2013.01); *B01J 8/087* (2013.01);
(Continued)

(58) Field of Classification Search
CPC ... C08H 8/00; D21C 1/02; D21C 1/10; D21C 3/222; D21C 7/06
(Continued)

(56) References Cited

U.S. PATENT DOCUMENTS 4,092,212 A * 5/1978 Richter .................... D21C 7/06
162/DIG. 2
8,057,639 B2   11/2011 Pschorn et al.
(Continued)

FOREIGN PATENT DOCUMENTS

CA          277322 A       1/1928
EP         2 160 289    * 10/2014
(Continued)

OTHER PUBLICATIONS

Theoretical analysis and experiment of pressure distribution and pressure gradient of shield screw conveyor: Taking sandy soil as an example, Scientific Reports, pp. 1-11 (Year: 2020).*
(Continued)

*Primary Examiner* — Stefanie J Cohen
(74) *Attorney, Agent, or Firm* — MILLEN, WHITE, ZELANO & BRANIGAN, P.C.; Ryan R. Pool

(57) ABSTRACT

The invention relates to a process for treating a lignocellulosic biomass comprising a solids content of not more than 80% by weight, said process comprising the use of at least
(Continued)

Figure 1:
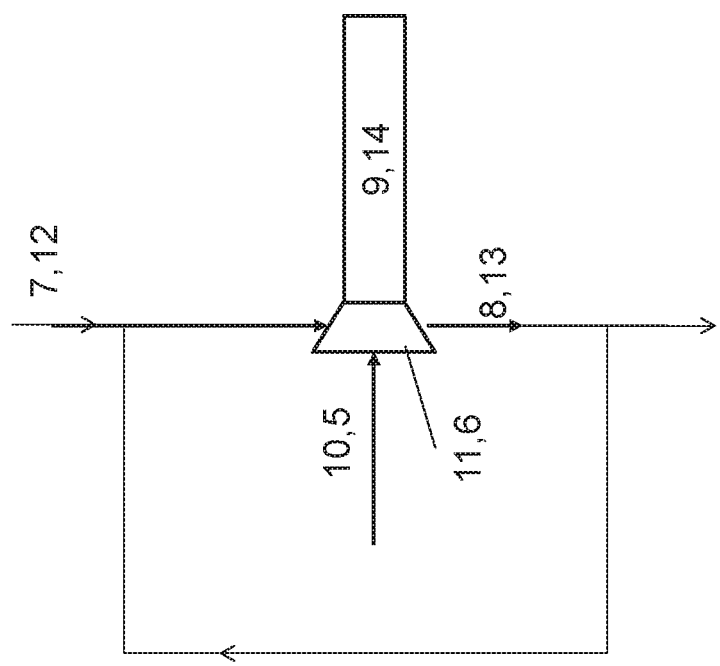

one reactor (9,14) for treating said biomass, in which the or at least one of said reactors is fed with biomass via a feed means (6,11) creating a pressure increase between the biomass inlet and the biomass outlet of said feed means, in which said feed means is washed by circulation of a washing fluid between a washing inlet (7,12) and a washing outlet (8,13). According to the process, at least a portion of the washing fluid (8,13) exiting the fluid outlet of the at least one feed means (6,11) is reintroduced into the washing inlet of the same feed means or of another of said feed means.

20 Claims, 4 Drawing Sheets

(51) Int. Cl.
*B01J 8/08* (2006.01)
*B01J 8/10* (2006.01)
*D21C 1/02* (2006.01)
*D21C 1/10* (2006.01)
*D21C 3/22* (2006.01)
*D21C 7/06* (2006.01)

(52) U.S. Cl.
CPC .................. *B01J 8/10* (2013.01); *D21C 1/02* (2013.01); *D21C 1/10* (2013.01); *D21C 3/222* (2013.01); *D21C 7/06* (2013.01); *B01J 2208/00017* (2013.01); *B01J 2208/00539* (2013.01)

(58) Field of Classification Search
USPC .......................................................... 127/44
See application file for complete search history.

(56) References Cited

U.S. PATENT DOCUMENTS

| | | | |
|---|---|---|---|
| 8,512,512 B2 | 8/2013 | Pschorn et al. | |
| 8,609,379 B2 | 12/2013 | Chheda et al. | |
| 9,434,961 B2 | 9/2016 | Dottori et al. | |
| 11,162,216 B2 * | 11/2021 | Lambert | D21C 1/02 |
| 2006/0196370 A1 * | 9/2006 | Kraft | B30B 9/122 |
| | | | 100/117 |
| 2010/0224268 A1 * | 9/2010 | Wingerson | D21B 1/30 |
| | | | 137/544 |
| 2010/0285534 A1 * | 11/2010 | South | C12P 7/10 |
| | | | 435/72 |
| 2011/0079219 A1 * | 4/2011 | McDonald | C13K 1/02 |
| | | | 127/1 |
| 2011/0300586 A1 * | 12/2011 | Liu | C08H 8/00 |
| | | | 162/76 |
| 2015/0184259 A1 | 7/2015 | Zebroski et al. | |
| 2017/0173819 A1 | 6/2017 | Turnbull et al. | |
| 2018/0258450 A1 | 9/2018 | Dottori et al. | |
| 2019/0241984 A1 | 8/2019 | Hudebine et al. | |

FOREIGN PATENT DOCUMENTS

| | | | | |
|---|---|---|---|---|
| WO | 10121367 A1 | 10/2010 | | |
| WO | 12061939 A1 | 5/2012 | | |
| WO | 12088108 A1 | 6/2012 | | |
| WO | 13141776 A1 | 9/2013 | | |
| WO | 15100444 A1 | 7/2015 | | |
| WO | 15173226 A1 | 11/2015 | | |
| WO | WO-2017136915 A1 * | 8/2017 | | C10L 1/02 |
| WO | 18015227 A1 | 1/2018 | | |

OTHER PUBLICATIONS

International Search Report PCT/EP2018/083542 dated Jan. 24, 2019 (pp. 1-3).

* cited by examiner

LIGNOCELLULOSIC BIOMASS TREATMENT METHOD

FIELD OF THE INVENTION

The invention relates to a process for treating lignocellulosic biomass for producing "second-generation" (2G) sugary juices. These sugary juices may be used to produce other products via a biochemical pathway (e.g. alcohols such as ethanol, butanol or other molecules, for example solvents such as acetone, etc.). This process generally includes three steps, which are the liquor preparation, the impregnation of the biomass and the pretreatment of the impregnated biomass, for example by cooking optionally coupled with steam explosion.

PRIOR ART

Lignocellulosic biomass represents one of the most abundant renewable resources on Earth. The substrates considered are very varied, they relate both to ligneous substrates such as various woods (hardwoods and softwoods), coproducts derived from agriculture (wheat straw, corn cobs, etc.) or from other agrifood, paper, etc. industries.

The process for biochemical conversion of the lignocellulosic material into 2G sugary juices notably comprises a pretreatment step and a step of enzymatic hydrolysis with an enzymatic cocktail. These processes also usually include an impregnation step before the pretreatment. The sugary juices resulting from the hydrolysis are then treated, for example by fermentation, and the process also comprises separation steps and/or a step of purification of the final product.

Lignocellulosic biomass is composed of three main polymers: cellulose (35% to 50%), which is a polysaccharide essentially constituted of hexoses; hemicellulose (20% to 30%), which is a polysaccharide essentially constituted of pentoses; and lignin (15% to 25%), which is a polymer of complex structure and of high molecular weight, composed of aromatic alcohols connected by ether bonds. These various molecules are responsible for the intrinsic properties of the plant wall and organize themselves into a complex entanglement.

Among the three base polymers that make up the lignocellulosic biomass, cellulose and hemicellulose are the ones that enable the production of 2G sugary juices.

Usually, hemicellulose is predominantly broken down into sugar during the pretreatment and cellulose is converted into glucose by enzymatic hydrolysis. However, access to crude cellulose remains difficult for enzymes to access, hence the need for a pretreatment. This pretreatment makes it possible to modify the physicochemical properties of the lignocellulosic material in order to improve the accessibility of the cellulose to enzymes and its reactivity to enzymatic hydrolysis.

Numerous technologies advantageous to the invention for performing this pretreatment exist, which will be grouped hereinbelow under the generic term "cooking": acidic cooking, alkaline cooking, steam explosion, "organosolv pulping" processes. The latter process concerns a pretreatment in the presence of one or more organic solvents and generally water. The solvent may be an alcohol (ethanol), an acid such as acetic acid or formic acid, or else acetone. "Organosols pulping" processes lead to at least partial dissolution of the lignin and partial dissolution of the hemicelluloses. There are thus two outlet streams: the pretreated substrate with residual cellulose, hemicellulose and lignin, and the solvent phase which contains the dissolved lignin and a portion of the hemicelluloses. There is generally a step of regeneration of the solvent which makes it possible to extract a lignin stream. Certain "organosolv pulping" treatments (notably with ethanol) are coupled with the addition of a strong acid (such as $H_2SO_4$). It may also be envisaged to place the biomass in contact with the solvent via an impregnation reactor before the cooking phase or to place the biomass in contact with the acid catalyst before performing "organosolv pulping" cooking.

Various configurations are reported, for example, in the document "Production of bioethanol from lignocellulosic materials via the biochemical pathway: A review", M. Balat, Energy Conversion and Management 52 (2011) 858-875, or in the document "Bioethanol production from agricultural wastes: an overview", N. Sarkar, S. Kumar Ghosh, S. Bannerjee, K. Aikat, Renewable Energy 37 (2012) 19-27.

One of the most effective pretreatments is acidic steam explosion which enables almost complete hydrolysis of hemicellulose and a significant improvement in the accessibility and reactivity of cellulose with respect to enzymes. This pretreatment may be preceded by other treatment(s).

All these pretreatments are applied to biomasses which are initially in solid form: the aim of the pretreatment is to destructure them.

One of the most effective pretreatments is steam explosion which enables almost complete hydrolysis of hemicellulose and a significant improvement in the accessibility and reactivity of cellulose with respect to enzymes. This pretreatment may be preceded by other treatment(s).

Patents U.S. Pat. Nos. 8,057,639 and 8,512,512 propose a process comprising a first step of hydrolysis of hemicellulose to C5 sugars under mild conditions which thus protect them from degradation. This step is performed in a first reactor at a pressure of 1.5 bar or more by injection of steam, at a temperature of 110° C. or more, and optionally in the presence of a weak acid. After this step, washing is performed in order to extract and recover the C5 sugar juices before sending the remaining biomass, enriched in cellulose and lignin, to a second step (second reactor) where the steam explosion takes place. This second reactor operates at a higher pressure than the first reactor with an injection of high-pressure steam which causes a sudden expansion of the biomass (steam explosion).

Patent application WO-2013/141776 describes, in the papermaking field, an impregnation process in a vertical reactor (impregnator) containing basic impregnation liquor, thus defining a first zone in which the impregnation is performed. The lignocellulosic material is received at the bottom of the impregnator, and it is transferred to the top of the impregnator by means of two transfer screws. During its transfer into the second zone of the impregnator located above the level of the liquid, the biomass drains and the liquid falls back into the first zone. In this configuration, the liquid level is controlled by the introduction of basic liquor.

When a treatment requires a pressure step (impregnation, pretreatment of cooking type or the like), it is necessary to make use of solid biomass introduction means that are compatible with these pressure steps. This is, for example, the case of compression screws, one embodiment of which is described in patent application CA 2 77322.

The aim of the invention is thus to improve the lignocellulosic biomass treatment. The aim of the invention is notably to improve the introduction of the biomass into a reactor performing one or more of the biomass treatment steps.

The aim of the invention is more particularly to improve the biomass impregnation and steam explosion steps as described in the abovementioned prior documents. An aim of the invention is also to make the treatment process, and notably these two steps, more efficient, in terms of energy and/or treatment fluid consumption.

Throughout the present text, the abbreviation "SC" denotes the solids content, which is measured according to the standard ASTM E1756-08(2015) "Standard Test Method for Determination of Total Solids in Biomass".

SUMMARY OF THE INVENTION

The subject of the invention is, first, a process for treating a lignocellulosic biomass or a lignocellulosic substrate comprising a solids content SC of not more than 90% by weight, said process comprising the use of at least one reactor for treating said biomass, in which the or at least one of said reactors is fed with biomass via a feed means creating a pressure increase between the biomass inlet and the biomass outlet of said feed means, and in which said feed means is washed by circulation of a washing fluid between a washing inlet and a washing outlet.

According to the invention, at least a portion of the washing fluid exiting the fluid outlet of the or of at least one of the feed means is reintroduced into the washing inlet of the same feed means or of another of said feed means.

According to the invention, the term "lignocellulosic biomass comprising a solids content of X %" means either a biomass which naturally comprises a solids content of X % (a "native" biomass) or a biomass which has this content after one or more operations prior to the process according to the invention.

It in fact proved to be very advantageous to thus "recycle" all or some of the washing water of the feed means, which may be, for example, a feed screw: at the very least, when the biomass does not contain any catalyst, a saving in washing fluid (water) consumption is achieved. It is also possible to achieve an energy saving, when this washing water must be heated before introduction into the washing circuit, since a "spent" fluid which already has a temperature above room temperature is then reinjected into the washing circuit. In addition, when it is a matter of washing a feed means for biomass supplemented with a catalyst (for example after an operation of impregnation with a catalytic liquor using an acidic, basic or oxidizing catalyst), it turned out that the washing water leaving the feed means could contain a certain content of catalyst (when the biomass undergoes a liquid extraction by passing through the feed means), but that this presence of "spent" washing water also containing a catalyst at the inlet of the washing circuit did not pose any problem.

It should be noted that the implementation of the invention is simple: the facility just needs to envisage one or more additional pipes for ensuring direct fluidic connection between the washing outlet and the washing inlet of the same feed means or between the washing outlet of one feed means with the inlet of another means.

It is also possible, according to the invention, to conserve the possibility of purging the optional portion of exiting washing water which is not recycled.

The lignocellulosic biomass treated according to the invention has a solids content SC of between 5% and 80% by weight. Preferably, it contains not more than 75%, notably not more than 70% or 65% by weight, and notably less than 50% by weight of solids.

The biomass treated according to the invention thus preferably has a certain moisture content before introduction into the feed means. This water may be naturally present, as is the case, for example, for a biomass in the form of wood chips. It may also naturally be in a low or very low amount, as may be the case for wheat or corn straw. If the moisture content is too low, the biomass may be humidified beforehand to reach a solids content of not more than 90% or 80% which is desirable for the implementation of the invention.

The feed means according to the invention places the biomass under compression, the aim of this generally being to introduce the biomass into a zone (a reactor) at higher pressure. This compression, from this pressure increase in the feed means, may bring about extraction or expulsion of at least a portion of the liquid contained in the biomass, which optionally becomes mixed with the washing fluid at the fluid outlet from the feed means. Optional extraction of at least a portion of the liquid contained in the biomass during its passage through the or one of the feed means may thus be performed, which is a consequence of the choice of the biomass feed means.

Thus, if the solids content of the biomass is high, rather in the upper values of the range mentioned above (for example of the order of 70% or 75% to 90%), there will be little or no extraction of fluid from this biomass out of the extraction means via the washing fluid outlet, and the invention makes it possible especially to recycle the washing fluid injected into the feed means.

In addition, if the solids content is lower, rather in the lowest values of the range mentioned above (for example below 70%, 65% or even below 50%), then there will be a certain amount of extraction of fluid from the biomass, and the invention then makes it possible to further reduce the supply of washing fluid, or even to delete it, the washing then being able to take place totally or partly with the fluid extracted from the biomass.

Preferably, the solids content SC of the lignocellulosic substrate leaving the feed means is then greater than or equal to 20% by weight, and preferentially greater than or equal to 40% by weight.

Preferably, the pressure increase created in the or at least one of the feed means is at least 0.05 MPa, and is notably between 0.05 and 4 MPa, for example between 0.1 and 2.5 MPa.

This or these feed means are, for example, in the form of a feed screw, which is notably at least partly conical, comprising a cowling equipped with a grate allowing the circulation of the washing fluid. The conical shape of the end part, generally, of this type of screw will thus compress the biomass, creating a pressure difference. This type of feed means has a major advantage: the screw makes it possible to form a hermetic plug of biomass which ensures the leaktightness and notably prevents any surges of liquid from the reactor into which it emerges.

An example of this type of screw is described in the document CA 2 77322.

The invention may thus apply to any treatment of biomass in a reactor using a pressurized biomass feed means, and notably any treatment at a pressure above atmospheric pressure or above the pressure at which the biomass is found before introduction into said reactor.

According to one embodiment, the process of the invention comprises a step of impregnating the biomass with an impregnation liquor containing a chemical catalyst. This step may be followed (directly or by envisaging one or more intermediate steps) by a cooking step, this cooking step being performed by the/one of the reactors equipped with the feed means.

According to one embodiment, the process of the invention comprises a step of impregnating the biomass with an impregnation liquor containing a chemical catalyst by passing the biomass through a bed of liquor or by spraying the biomass with the liquor on a conveyor of belt type or by passing the biomass through a stirred reactor.

According to another embodiment, the process of the invention comprises a step of impregnating the biomass with an impregnation liquor containing a chemical catalyst, by introduction into a reactor via said or at least one of said feed means.

According to one embodiment, the process of the invention comprises a step of treating the biomass by cooking, notably in the or one of the reactors equipped with a feed means.

One example of implementation of the process of the invention is as follows: it is a matter of treating a lignocellulosic biomass, said process comprising the following steps:

a. Preparing an impregnation liquor containing a chemical catalyst intended for the impregnation of the biomass, chosen from an acid catalyst, a basic catalyst and an oxidizing catalyst, and preferably an acid catalyst, in a preparation zone b. Introducing the milled biomass via an inlet of an impregnation reactor by means of a first feed means, said first feed means being washed by circulation of a first washing fluid between an inlet and an outlet of said means c. Introducing the liquor into the impregnation reactor via a first liquor inlet of the reactor d. Transferring the impregnated and drained biomass from an impregnation reactor outlet to an inlet of a cooking pretreatment reactor, the introduction into said pretreatment reactor taking place via a second feed means, said second feed means being washed by circulation of a second washing fluid between an inlet and an outlet of said feed means e. Pretreating said biomass in said cooking reactor.

In addition, the process also comprises the following step(s):

f. Reintroducing at least a portion of the first and/or of the second washing fluid leaving the fluid outlet of said first or of said second feed means into the washing inlet of the first feed means and/or of the second feed means.

Preferably, the impregnation and the steam cooking pretreatment take place continuously. However, the invention also applies to a process in which these two steps are discontinuous, in batch mode.

Preferably, the cooking is followed by steam explosion, but this explosion step remains optional.

Preferably, the impregnation in this embodiment may take place in a reactor whose biomass inlet is located in a first impregnation zone of said impregnation reactor which comprises two superposed zones, said first impregnation zone and a second "draining" zone which is above the impregnation zone and which is equipped with an impregnated and drained biomass outlet. More preferably in this reactor configuration, the introduction of the liquor into said reactor takes place via a first liquor inlet of the reactor which is located in said first impregnation zone of the reactor.

The invention thus proposes in this example to recycle or to reuse all or a portion of the washing fluids of the two feed screws. The particularly advantageous feature is that it turned out that it was effectively possible to recycle one and/or the other of the washing fluids, or both of them, without the quality of the impregnation or the quality of the cooking being affected in any way.

In addition, this recycling may take place in various ways, very flexibly, and for each of the washing fluids:

Thus, the washing fluid of the feed means of the impregnation reactor is generally water-based, and thus "spent" water is predominantly recovered at the outlet of the feed means. Recycling this spent water by reintroducing it into the inlet of one or other of the feed means of the screws allows a significant reduction in the water consumption of the process. When, in addition, this water is heated, an energy saving is also observed since the washing water then globally requires less heating. Circulation of washing fluid in a closed loop is thus very advantageous.

As regards the washing fluid of the feed means of the cooking pretreatment reactor, the situation is slightly different, since the washing fluid, which is generally also water, will have a tendency to become charged with catalyst on washing the feed means which transports the biomass already impregnated with the catalytic liquor: expulsion of a portion of the liquid from the impregnated biomass containing the catalyst takes place in this screw, and this liquid becomes mixed, at the screw outlet, with the washing water therefrom. At the outlet of this feed means, this is then usually referred to as "press liquor". This press liquor may also be recycled either to return to the washing inlet of the feed means of the pretreatment reactor, or to go to the washing inlet of the first feed means. Even when, in addition, the impregnation liquor is very acidic, and when the press liquor therefore is also, to a lesser extent, this does not pose any problem as regards the equipment, since the biomass feed means of the impregnation reactor is generally designed to withstand without deterioration contact with the catalytic liquor (to combat any surges of liquor into the biomass feed means).

In both cases, it remains possible for some of the spent water and/or of the press liquor to be also sent to the purge. These two cases are, in addition, alternative or cumulative.

According to a preferred embodiment, the process of the invention also comprises the reintroduction of a portion of the first and/or of the second washing fluid leaving the fluid outlet of the first or of the second feed means into the impregnation liquor preparation zone for the purpose of preparing a.) said liquor.

It is possible to adjust and to vary at will during the process, as need be, the proportion of the exiting washing fluid that will be reintroduced into the feed means relative to the proportion that is used for preparing the catalytic liquor or relative to the proportion that is sent to the purge.

In the case where it is a portion of the press liquor that is reintroduced into the liquor preparation zone, the advantage is twofold, since the consumption of water for the preparation of the liquor is reduced, but also the consumption of catalyst, since the press liquor contains same. The liquor preparation step generally takes place with varied regulation means with respect to certain physicochemical parameters, such as the temperature, the content of catalyst in the liquor (for example by regulating the pH when it is a matter of acid or basic catalysis), this supply of additional catalyst may thus be taken into account by these regulation means to maintain the desired characteristics for the liquor.

The washing of the first and/or second feed means may take place continuously or discontinuously, thus with permanent washing or washing at given time intervals, for example. The washing circulation flow rate may also vary, notably as a function of the biomass mass flow rate introduced into one or other of the reactors.

Reintroducing a portion of the first and/or of the second washing fluid leaving the fluid outlet of said first or of said second feed means into the washing inlet of the first feed means and/or of the second feed means may also take place continuously or discontinuously.

According to one embodiment, a portion of the first washing fluid at the washing outlet of the first feed means is reintroduced into the washing inlet of the first or of the second feed means, and another portion of said washing fluid is reintroduced into the liquor preparation zone for the purpose of preparing same.

Symmetrically, according to a second embodiment that is compatible with the preceding one, a portion of the second washing fluid at the washing outlet of the second feed means is reintroduced into the washing inlet of the first or of the second feed means, and another portion of said washing fluid is reintroduced into the liquor preparation zone for the purpose of preparing same.

According to one embodiment, the washing of the feed means is performed in the presence of biomass supplemented with a catalyst, notably an acid, basic or oxidizing catalyst, the washing fluid leaving the fluid outlet of said feed means contains a certain content of said catalyst when the biomass undergoes a liquid extraction by passing through said feed means, and said washing fluid containing this catalyst is at least partly reintroduced into the washing inlet of the same feed means or of another of said feed means, notably conveying biomass free of catalyst. The term "catalyst" is to be taken here in the broad sense as any reagent that is capable of interacting with the biomass, notably for the purpose of modifying one of its physico-chemical or rheological properties. With the invention, it has thus been discovered that it was possible to recycle a washing water, even when supplemented with such a catalyst, to reintroduce it either into the same feed means, or into another, which, itself, transports only biomass: the fact that the reintroduced washing water is not pure water but water supplemented with catalyst proved to have no harmful impact on the process as a whole, which was unexpected.

A subject of the invention is also the facility performing the process described previously, notably a facility which comprises at least one reactor for treating a lignocellulosic biomass having a solids content of not more than 90% by weight with feeding with biomass of the or of at least one of said reactors by a feed means creating an increase in pressure between the biomass inlet and the biomass outlet of said feed means. The washing of said feed means is performed by circulating a washing fluid between a washing inlet and a washing outlet, and a means for reintroducing at least a portion of the washing fluid leaving the fluid outlet of the or of at least one of the feed means into the washing inlet of the same feed means or of another of said feed means.

A subject of the invention is also an embodiment of a lignocellulosic biomass treatment facility, comprising:

A zone for preparing an impregnation liquor containing a chemical catalyst for the impregnation of the biomass, chosen from an acid, basic or oxidizing catalyst, and preferably an acid catalyst, and equipped with a liquor outlet An impregnation reactor, notably comprising a first impregnation zone equipped with a biomass inlet and a second zone superposed on the first, known as the draining zone, said reactor being equipped with a biomass inlet and outlet A first means for feeding milled biomass to the impregnation reactor via the biomass inlet of the impregnation reactor, notably located in the first impregnation zone A means for feeding impregnation liquor to the reactor connecting a liquor outlet of the liquor preparation zone to a first liquor inlet in the impregnation reactor, notably in its first impregnation zone A reactor for pretreatment of the impregnated biomass by steam explosion, a biomass inlet of which is connected to the biomass outlet of the impregnation reactor A second means for feeding impregnated biomass to the pretreatment reactor via the biomass inlet of said pretreatment reactor A circulation of washing fluid between an inlet and an outlet of the first milled biomass feed means of the impregnation reactor A circulation of washing fluid between an inlet and an outlet of the second impregnated biomass feed means of the pretreatment reactor the facility also comprising A means for reintroducing at least a portion of the first and/or of the second washing fluid leaving the fluid outlet of said first or of said second feed means into the washing inlet of the first feed means and/or of the second feed means.

Advantageously, the facility also comprises a means for reintroducing a portion of the first and/or of the second washing fluid leaving the fluid outlet of the first or of the second feed means into the impregnation liquor preparation zone.

Advantageously, it may envisage a means for reintroducing a portion of the first washing fluid at the washing outlet of the first feed means into the washing inlet of the first or of the second feed means, and a means for reintroducing another portion of said fluid into the liquor preparation zone.

The facility according to the invention may also envisage a means for reintroducing a portion of the second washing fluid at the washing outlet of the second feed means into the washing inlet of the first or of the second feed means, and a means for reintroducing another portion of said fluid into the liquor preparation zone.

These reintroduction means are advantageously pipes or a set of pipes enabling the desired hydraulic connection, the production of which is known per se.

A subject of the invention is also the use of the process or of the facility described previously for the treatment of any lignocellulosic biomass such as wood, straw, agricultural residues, and all dedicated energy crops, which may be annual or perennial plants such as *miscanthus*, in order to produce sugars, biofuels or biobased molecules.

DETAILED DESCRIPTION

Figure 2:
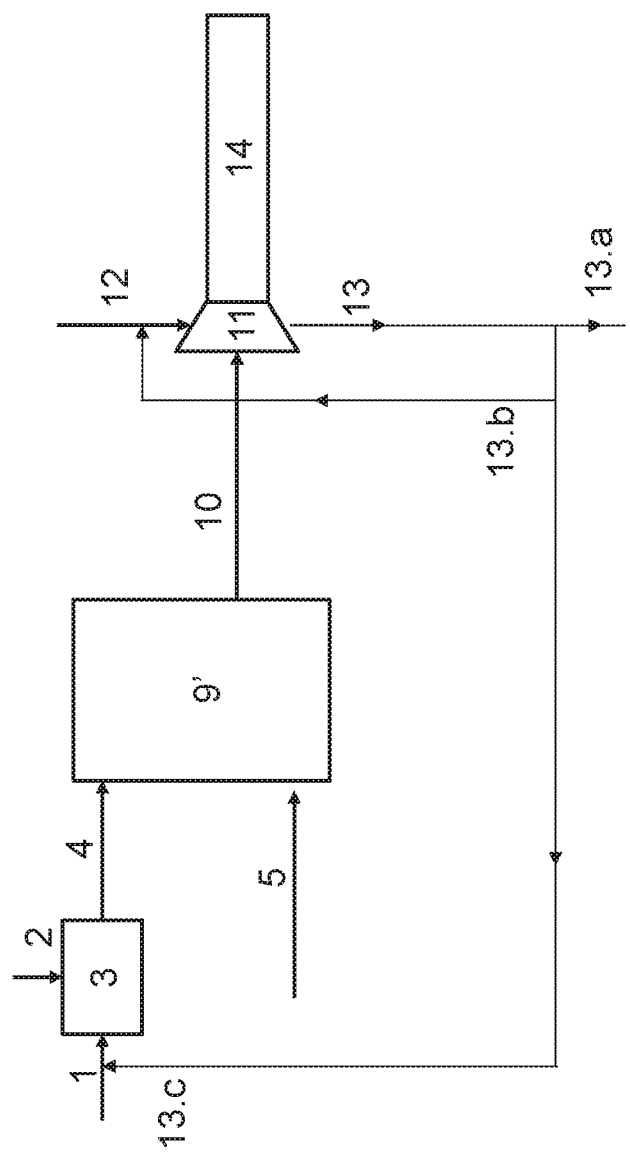
Figure 3:
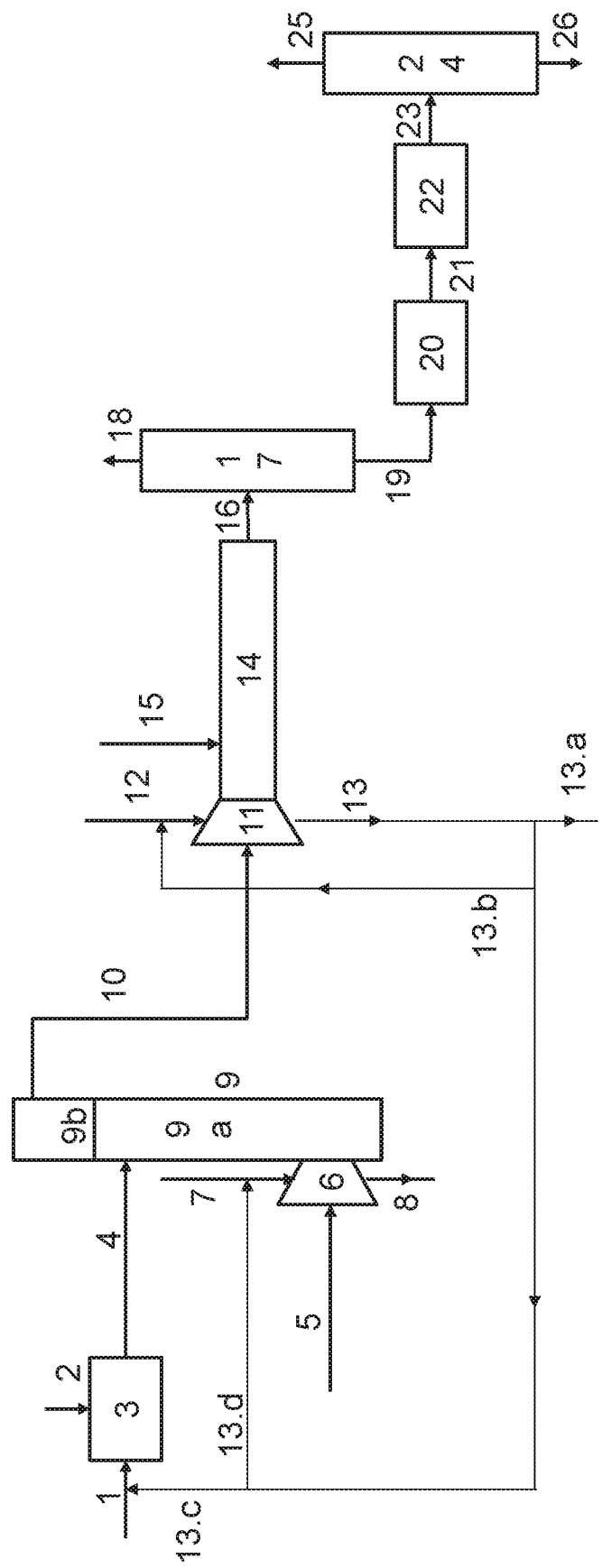
Figure 4:
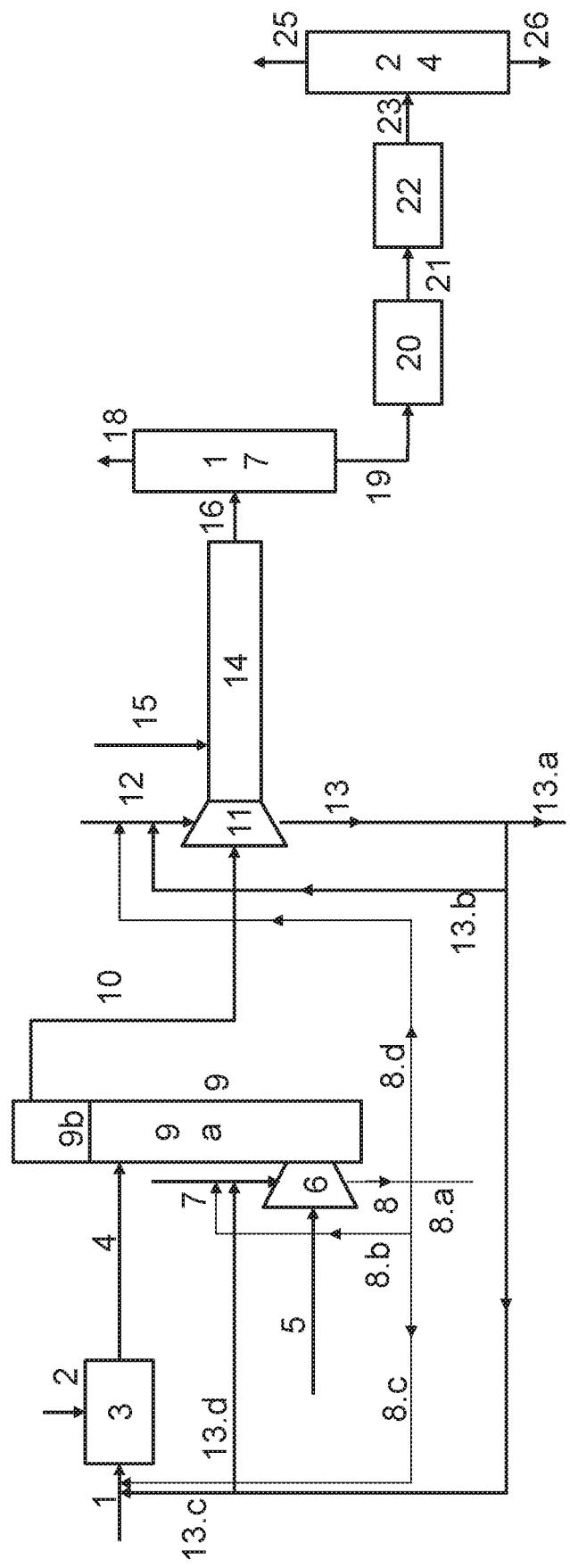

The invention will be described in detail below with the aid of nonlimiting examples of the process according to the invention, illustrated by the following figures:

FIG. 1: a synoptic representation, of block diagram type, of the general principle of the biomass treatment process according to the invention, FIG. 2: a synoptic representation, of block diagram type, of a first embodiment of the biomass treatment process according to the invention, FIG. 3: a synoptic representation, of block diagram type, of a second embodiment of the biomass treatment process according to the invention, FIG. 4: a synoptic representation, of block diagram type, of a third embodiment of the biomass treatment process according to the invention.

FIG. 1 is thus the representation of the principle of the invention, FIG. 2 concentrates on two biomass treatment steps: catalytic impregnation and then cooking. FIGS. 3 and 4 describe the whole process for treating biomass up to its enzymatic hydrolysis, after impregnation and cooking.

The invention is more particularly focused on the first two steps, namely impregnation of the milled biomass and treatment by cooking of the biomass once it has been impregnated.

DESCRIPTION OF THE FIGURES USING THE FOLLOWING REFERENCES

The same references correspond to the same components/fluids/products on all of the figures:
1: Entry of water into the liquor preparation tank
2: Entry of acid into the liquor preparation tank
3: Liquor preparation tool (tank)
4: Acidic liquor to the impregnation tool (reactor)
5: Milled biomass
6: Screw or plug-screw feeder of the impregnation tool
7: Water for washing the plug-screw feeder of the impregnation tool
8: Washing liquid outlet of the plug-screw feeder of the impregnation tool
9, 9': Impregnation tool (reactor)
9a: Impregnation zone of the impregnation tank 9
9b: Draining zone of the impregnation tank 9
10: Impregnated and drained biomass
11: Screw or plug-screw feeder of the pretreatment tool
12: Water for washing the plug-screw feeder of the pretreatment tool
13: Press liquor of the plug-screw feeder of the pretreatment tool
13.a: Press liquor to the purge
13.b: Recycling of the press liquor for washing the plug-screw feeder of the pretreatment tool
13.c: Recycling of the press liquor into the acidic liquor preparation tank 3
13.d: Recycling of the press liquor for washing the plug-screw feeder of the impregnation tool
14: Pretreatment cooking tool (explosion reactor)
15: Injection of steam for the pretreatment
16: Pretreated biomass and steam
17: Tool (cyclone) for separating steam and pretreated biomass
18: Steam to condensation
19: Pretreated biomass
20: Enzymatic hydrolysis
21: Enzymatic hydrolysis must containing sugars
22: Alcoholic (ethanolic) fermentation
23: Fermentation wine containing ethanol (alcohol)
24: Distillation
25: Concentrated alcohol
26: Crude vinasses FIG. 1 very schematically represents the principle of the invention in its simplest embodiment (process of which the details and various steps will be subsequently described with the aid of FIGS. 2 to 4): the biomass 5,10 (impregnated or not impregnated with a catalytic liquor) is introduced into a reactor 9,14 for a treatment, by a pressurized feed means 6,11 which is a screw (also known as a plug screw feeder) whose end portion is conical, which has a cowling with a draining grate, a washing water inlet 7,12 and a washing water outlet 8,13. A hermetic biomass plug becomes created in the downstream portion of the screw, which creates a compression on the biomass reflected by a pressure difference between the biomass inlet and the biomass outlet of the screw of at least 0.05 MPa, for example about 0.5 MPa. The compression applied to the biomass may lead to the expulsion of a portion of the liquid contained in the biomass, notably when the SC of the biomass is less than 80% before it enters the pressurized feed means 6,11. The liquid thus extracted becomes mixed with the washing water and is withdrawn with the spent washing water 8,13.

According to the invention, at least a portion of the washing water leaving the screw 8,13 is reinjected into the washing water inlet 7,12 of the screw. It is noted that it remains possible for a portion of the exiting washing water to be simply purged, and for a portion of the entering washing water to originate from a water supply as in the prior art, to supplement the amount of water recycled into the screw inlet, periodically or systematically.

In this representation, the recycling of the washing water applies to the same screw, but, as will be detailed with the other figures, the invention also relates to the total or partial recycling of the washing water at the outlet of one screw into the inlet of another feed screw, when the process envisages several feed screws for several reactors.

The solids content of the biomass entering the feed screw is, here, 50%. It may occur that a portion of the liquid of the biomass is extracted during its transportation in the screw, this extracted water becoming mixed with the spent washing water at the washing outlet of the screw. The lower the solids content of the biomass, the more extraction of fluid there will be from the biomass in the feed screw, this fluid supplementing or even optionally totally replacing the washing fluid at the screw inlet.

FIG. 2 represents a step of impregnation of the biomass with an acidic liquor, followed by a cooking step forming part of a biomass treatment:

The process proceeds in the following manner: The water and the acid are introduced, respectively, via pipes 1 and 2 into the acidic liquor preparation tank 3. The acidic liquor of pipe 4 is then injected into an impregnation device 9' to be mixed with the milled biomass. The impregnation device is, here, a conveyor, of the conveyor belt type driven in translation by rotation of rollers supporting the belt, on which belt is placed the biomass to a given thickness. While it is being conveyed, the biomass is subjected to spraying with acidic liquor taken from the tank 3, via nozzles placed above the belt. The excess liquor may be recovered under the belt in a collection zone, to be optionally totally or partly recycled.

The impregnated biomass 10, which has optionally been drained beforehand, is introduced into the treatment unit 14 by means of another feed screw of "plug screw feeder" type 11 which compresses the biomass to form a biomass plug. This hermetic biomass plug ensures the leaktightness and prevents leakages of steam, when the cooking reaction in this biomass reactor 14 takes place by steam explosion. During this compression in the screw 11, a solid/liquid separation takes place, and the spent acidic liquor is evacuated through the cowling grate of the screw. This screw is washed with water from pipe 12 which thus becomes mixed with spent acidic liquor, and the mixture of washing water and of spent acidic liquor (known as press liquor) is evacuated in pipe 13. The press liquor may also contain solid derived from the washing of the screw 11.

Optionally, a solid/liquid separation step is performed on this stream 13, for example with a device using a grate of curved shape.

The stream 13 can then be directed toward:
a purge via pipe 13a
recycling via pipe 13b to replace all or some of the water 12 for washing the screw 11 recycling into the acidic liquor preparation tank 3 via pipe 13*c*.

Various possibilities then become available:
- according to one embodiment, all of the stream 13 is sent into pipe 13*b* to replace all or some of the washing water 12,
- according to another embodiment, only a part of the stream 13 is sent into pipe 13*b* to replace all or some of the washing water 12, and the rest is sent via pipe 13*c* to contribute toward the manufacturing of liquor (for example in a volume proportion between the two variants of between 20/80 and 80/20).

The biomass is treated in the treatment tool 14 by cooking and steam explosion in the manner described in the following figures. FIG. 3 presents a variant relative to FIG. 2 in the way of performing the impregnation of the biomass, and it also represents the steps subsequent to the cooking/steam explosion of the biomass.

Only the differences with the process according to FIG. 2 will be described here, the two processes being otherwise performed identically.

The water and the acid are introduced, respectively, via pipes 1 and 2 into the acidic liquor preparation tank 3. The acidic liquor of pipe 4 is then injected into an impregnation device 9 to be mixed with the milled biomass. It is, here, a reactor, which is positioned substantially vertically here.

The premilled biomass is introduced into the process via pipe 5 in a feed screw 6, similar to the screw 11 already described in the preceding figure, also with a water washing circuit. This screw makes it possible to form a hermetic biomass plug which ensures the leaktightness and prevents leakages of acidic liquor. This screw is washed with water which enters via pipe 7 and leaves via pipe 8. At the screw outlet, expansion of the plug takes place in the bottom zone of the impregnation reactor 9. The biomass becomes impregnated with acidic liquor in the impregnation zone 9*a* before being drained in the draining zone 9*b*. It is conveyed into the reactor 9 via one or two transportation screws.

The stream 13 can then be directed, as previously, toward:
- a purge via pipe 13*a*
- recycling via pipe 13*b* to replace all or some of the water 12 for washing the screw 11
- recycling into the acidic liquor preparation tank 3 via pipe 13*c*;
- but another possibility also becomes available, since, here, the stream 13 can also be recycled via pipe 13*d* to replace all or some of the water 7 for washing the screw 6.

Continuing with the more detailed description of the reactor 14 common to FIGS. 2 to 4 and to the steps following the treatment in this reactor 14:

The steam required for heating the reactor 14 is introduced via pipe 15. At the reactor outlet, the biomass/steam mixture is expanded and conveyed via line 16 to the separation tool 17. The separation tool 17 may be of cyclone type: it allows the separation of the steam 18 from the pretreated biomass 19.

The pretreated biomass is then transformed in the transformation tool 20 into a must 21 containing sugars, using an enzymatic cocktail. The sugars are converted into alcohol (e.g. ethanol, acetone, butanol) by fermentation in the fermentation step 22. The fermentation wine 23 is sent to a separation and purification step 24. Step 24, which is performed, for example, by distillation, allows the separation of a stream 25 containing the concentrated alcohol from the crude vinasses (spent water, residual lignin) 26.

The details of the operating conditions for the steam explosion, must conversion and fermentation steps, which are considered as being known to those skilled in the art, will not be given here.

FIG. 4 shows a variant relative to FIG. 3.

The additional references relative to FIG. 3 are:
- 8: Spent washing liquid outlet of the impregnation tool screw 6
- 8.*a*: Spent washing liquid to the purge
- 8.*b*: Recycled washing liquid for washing the impregnation tool screw
- 8.*c*: Washing liquid recycled into the acidic liquor preparation tank 3
- 8.*d*: Recycled washing liquid for washing the screw 11 of the pretreatment tool 14

Only the differences with the process according to FIG. 3 will be described here, the two processes being otherwise performed identically:

Here, the water 8 for washing the feed screw 6 is also recycled according to various alternative or cumulative possibilities. The liquid 8 for washing the transfer screw 6 may be either:
- purged from the system via pipe 8*a*
- recycled via pipe 8*b* to replace the water 7 for washing the feed screw 6 of the impregnation reactor 9 recycled via pipe 8*c* into the acidic liquor tank 3
- recycled via pipe 8*d* to replace the water 12 for washing the feed screw 11 of the explosion tool/reactor 14.

According to another embodiment of the invention, all of the stream 8 is sent into pipe 8*b* or into pipe 8*d* to replace all or some of the washing water 12 or 7. According to another embodiment, a portion is sent into pipe 8*b* or 8*b*, and the rest is sent via pipe 8*c* to contribute toward the preparation of the impregnation liquor. The ratio between the two parts, by volume, may be between 80/20 and 20/80.

In any case, as thus regards the recycling either of the spent water from the screw 6 or of the press liquor from the screw 11, a portion may also be taken to be sent to the purge (pipes 13*a*, 8*a*).

Needless to say, it is also within the context of the invention to combine the recycling of the spent water from the washing of the screw 6 with that of the press liquor from the screw 11, or to recycle only one or the other.

A few operating details or variants are given below for the first two biomass treatment steps described previously:

The impregnation step is performed at a temperature ranging from 10 to 95° C., and the residence time of the biomass in said impregnation step is between 20 seconds and 12 hours. Preferably, the residence time of the biomass is between 30 seconds and 60 minutes.

The impregnation step may be performed in batch or continuous mode. Preferably, this step is performed in continuous mode. The impregnation step is preferably performed at atmospheric pressure. Preferably, the impregnation step is performed in a single step.

The impregnation step involves placing in contact the biomass and the acidic liquor. It may be performed, for example, by dipping or by spraying.

The impregnation step is performed in equipment known to those skilled in the art, for example in a stirred reactor, by horizontal or vertical throughput of the biomass in a bed of liquor, by spraying on a belt transporting the biomass (as seen in FIG. 2) or in a transportation screw.

The impregnation reactor or impregnator is generally equipped with one or more tools which transfer(s) the lignocellulosic substrate from its entry to the outlet aperture. These tools may be, for example, screws or belts. The impregnator is moreover equipped with one or more pipes for conveying the acidic liquor and also, if need be, one or more pipes for withdrawing acidic liquor. Said acidic liquor inlet and outlet pipes are generally installed so as to function by cocurrent or counter-current recycling.

The Pretreatment Step (Cooking):

The lignocellulosic substrate undergoes this pretreatment step, which is notably directed toward modifying the physical and physicochemical properties of the cellulosic fraction, such as its degree of polymerization and its state of crystallinity.

The pretreatment includes a cooking zone. This cooking is performed at a temperature of between 100° C. and 250° C., and more preferentially between 130° C. and 230° C., at a pressure of between 0.1 and 4 MPa. The residence time in the cooking zone is between 10 seconds and 4 hours, and more preferentially between 3 minutes and 1 hour.

The cooking may take place in batch or continuous mode. It may be performed in any equipment known to those skilled in the art, for example a stirred reactor, a horizontal tubular reactor equipped with a transportation screw, a non-stirred batch reactor, etc. The thermal energy required for the cooking may be supplied via a heat exchange with a heat-transfer fluid (indirect), by electrical heating, or by direct injection of a hot fluid, for example pressurized water or steam.

The exit of the solid at the end of cooking may take place by rapid decompression, by slow decompression, after a temperature reduction induced by direct or indirect heat exchange, etc.

In one embodiment (preferred), the cooking zone is heated with steam by direct injection and is followed by abrupt decompression of the medium, this process being known as steam explosion (or "steamex"). This is a process in which the lignocellulosic substrate is rapidly brought to a high temperature by injecting pressurized steam. Stoppage of the treatment takes place by abrupt decompression.

The operating conditions of the steam explosion process are as follows:

steam is injected directly into the reactor;

the temperature of the reactor is generally between 150 and 250° C., preferably between 160° C. and 220° C., the pressure is between 0.5 and 2.5 MPa, more preferentially between 0.8 and 2.0 MPa, the residence time before the expansion phase ranges from 10 seconds to 25 minutes, and preferably between 3 minutes and 15 minutes.

The steam explosion may be performed in batch or continuous mode and the depressurization step which permits destructuring of the biomass may proceed in one or more steps.

Examples of implementation of this or these recycling operations using the process according to FIG. 4 are now described:

Comparative Example 1

This is an example with recycling of only the spent washing waters as top-up water for the liquor preparation tank. The biomass to be treated is wood having the following features:

Feedstock: Poplar wood, flow rate 7.47 tons/hour, solids content (SC): 50%, mean composition (SC basis):

|  | % (SC basis) |
|---|---|
| Cellulose | 42.6% |
| Hemicellulose | 20.5% |
| Lignin and others (ash, extractable matter, etc.) | 36.9% |

The acronym "SC" denotes the solids content, which is measured according to the standard ASTM E1756-08(2015) "Standard Test Method for Determination of Total Solids in Biomass".

The wood is used in the form of chips with a characteristic size of 50 mm. The temperature of the chips entering the unit is room temperature. The chips 5 are conveyed to the impregnation reactor 9 via the conical screw 6. This screw is washed with washing water 7,8 at a flow rate of 1 ton/hour. During the compression performed by the screw 6, liquid is extracted from the poplar chips at a rate of 0.679 ton/hour, the total flow rate of spent water for washing the screw 6 of the impregnation reactor 9 is thus 1.679 tons/hour.

The following are introduced into the impregnation reactor 9:

the compressed wood chips, via the conical screw 6

2.9 tons/hour of an acidic liquor 4 prepared with water 1 and sulfuric acid 2 at a mass concentration of 1.57% by weight (wt), at a temperature of 90° C.

The impregnated chips are removed from the impregnation reactor 9 and transferred to a steam explosion reactor 14. Entry into the pretreatment reactor takes place by transfer by means of another conical screw 11. This screw is washed with washing water at a flow rate of 0.6 ton/hour. During the compression performed by the screw 11, liquid is extracted from the impregnated poplar chips at a rate of 2.95 tons/hour, the total flow rate of spent water for washing the screw 6 of the impregnation reactor 9 is thus 3.55 tons/hour. This stream contains 0.5% by weight of $H_2SO_4$.

The steam explosion pretreatment is performed at 200° C. in a continuous configuration using a short residence time. The medium is abruptly expanded to a pressure of 1.3 atm.

The acidic liquor preparation tank 3 located upstream of the impregnation delivers a flow rate of 2.9 tons/hour of acidic liquor. This liquor is prepared with water and 96% sulfuric acid, the respective flow rates are 2.8526 tons/hour of water and 0.0474 ton/hour of acid at a concentration of 96% by weight. The total consumption of water in this configuration is 4.5526 tons/hour and the total consumption of acid is 0.0474 ton/hour of sulfuric acid at a concentration of 96% by weight.

The spent waters from the washing of the screws 6 and 11 are sent to the purge via pipes 8a and 13a.

Comparative Example 2

This repeats comparative example 1, the only difference here being that a portion 13c of the stream obtained from the washing of the screw 11 of the explosion reactor 14 is sent to the acidic liquor preparation tank 3: this flow is equal to the liquid top-up required taking into account the top-up of acid that should be made to have the target acidity. Thus, the flow rate of recycled liquid is 2.8675 tons/hour and the flow rate of top-up acid is 0.0325 ton/hour of sulfuric acid at 96% by weight. In this second configuration, the total consumption of water is 1.6 tons/hour (for the washing of the screw 11) and the consumption of acid is 0.0325 ton/hour of sulfuric acid at 96% by weight. A stream of 2.362 tons/hour of spent waters must be treated.

Example 3 According to the Invention

In this example, a process of impregnation according to the invention and of pretreatment of wood, treating the same feedstock as in the preceding comparative examples 1 and 2, is presented. The wood is used in the form of chips with a characteristic size of 50 mm. The temperature of the chips entering the unit is room temperature.

The chips are conveyed to the impregnation reactor 9 via the conical screw 6. This screw is washed with a washing liquid 7,8,13d at a flow rate of 1.0 ton/hour; this liquid originates from the mixture of water 7 and of the liquid 13d for washing the screw 11 of the pretreatment reactor 14. During the compression performed by the screw 6, liquid is extracted from the poplar chips at a rate of 0.679 ton/hour, the total flow rate of spent water for washing the screw 6 of the impregnation reactor 9 is thus 1.679 tons/hour.

The following are introduced into the impregnation reactor 9:
the compressed wood chips, via the conical screw 6
2.9 tons/hour of an acidic liquor 4 prepared with water 1 and sulfuric acid 2 at a mass concentration of 1.57% by weight, at a temperature of 90° C.

The impregnated chips are removed from the impregnation reactor 9 and transferred to a steam explosion reactor 14. Entry into the pretreatment reactor 14 takes place by transfer by means of a second conical screw 11. This screw 11 is washed with washing water 12,13 at a flow rate of 0.6 ton/hour. During the compression performed by the screw 11, liquid is extracted from the impregnated poplar chips at a rate of 2.95 tons/hour, the total flow rate of spent water for washing the screw 11 of the reactor 14 is thus 3.55 tons/hour. This stream contains 0.5% by weight of $H_2SO_4$. The steam explosion pretreatment is performed at 200° C. in a continuous configuration using a short residence time. The medium is abruptly expanded to a pressure of 1.3 atm.

The acidic liquor preparation tank 3 located upstream of the impregnation delivers a flow rate of 2.9 tons/hour of acidic liquor. Preferably, it is equipped with sensors for measuring the pH and the flow rate for the water, acid, spent liquor and prepared liquor.

A portion of the stream obtained from the washing of the screw 11 of the explosion reactor 14 is sent to the acidic liquor preparation tank 3: this flow is equal to the liquid top-up required, taking into account the top-up of acid that should be made to have the target acidity. Thus, as in the preceding examples, the flow rate of recycled liquid is 2.8675 tons/hour and the flow rate of top-up acid is 0.0325 ton/hour of sulfuric acid at 96% by weight. The part 13d of the stream of spent liquid 13 for washing the screw 11 of the pretreatment reactor 14 which is not sent as top-up liquid for the liquor tank 3 is sent to wash the screw 6 of the impregnation reactor 9, at a flow rate of 0.683 ton/hour, as a supplement to 0.317 ton/hour of water. The total water consumption is thus 0.917 ton/hour. A stream of 1.679 tons/hour of spent waters must be treated.

Thus, the process according to the invention allows, relative to the configuration of comparative example 2:
a reduction of the mass consumption of water of more than 42%
a 29% reduction in the mass of spent waters to be treated.

Example 4 According to the Invention

In this example, a process of impregnation according to the invention and of pretreatment of wood, treating the same feedstock as in comparative example 1, is presented. The wood is used in the form of chips with a characteristic size of 50 mm. The temperature of the chips entering the unit is room temperature.

The chips are conveyed to the impregnation reactor 9 via the conical screw 6. This screw is washed with washing water 7 at a flow rate of 1.0 ton/hour. During the compression performed by the screw, liquid is extracted from the poplar chips at a rate of 0.679 ton/hour, the total flow rate of spent water for washing the screw 6 of the impregnation reactor 9 is thus 1.679 tons/hour.

The following are introduced into the impregnation reactor 9:
the compressed wood chips, via the conical screw 2
2.9 tons/hour of an acidic liquor 4 prepared with water 1 and sulfuric acid 2 at a mass concentration of 1.57% by weight, at a temperature of 90° C.

The impregnated chips are removed from the impregnation reactor 9 and transferred to a steam explosion reactor 14. Entry into the pretreatment reactor 14 takes place by transfer by means of a second conical screw 11. During the compression performed by the screw, liquid 13 is extracted from the impregnated poplar chips at a rate of 2.95 tons/hour. A portion 13b of this stream, 1.5 tons/hour, is used to wash the conical screw 11, according to the invention. The total flow rate of spent water for washing the screw 6 of the impregnation reactor 9 is thus 4.45 tons/hour, of which 1.5 tons/hour are recycled for the washing 13b. This stream contains 0.602% by weight of $H_2SO_4$. This stream is more concentrated in acid than the stream extracted from example 1, since the spent acidic liquor extracted during the compression has not been diluted with the screw washing water. The steam explosion pretreatment is performed at 200° C. in a continuous configuration using a short residence time. The medium is abruptly expanded to a pressure of 1.3 atm.

The acidic liquor preparation tank 3 located upstream of the impregnation delivers a flow rate of 2.9 tons/hour of acidic liquor.

The stream 13 obtained from the washing of the screw 11 of the pretreatment reactor 14 which is not used for the washing 13b of the screw is sent 13c to the acidic liquor preparation tank 3 at a flow rate of 2.87 tons/hour, and the remainder 13a (0.08 ton/hour) is purged. The flow rate of top-up acid is 0.0294 ton/hour of sulfuric acid at 96% by weight.

In the process according to this example, the total consumption of water is 1.0 ton/hour (for the washing of the impregnation screw 6) and the consumption of acid is 0.0294 ton/hour of sulfuric acid at 96% by weight. A stream of 1.759 tons/hour of spent waters must be treated.

Thus, the process according to this example in accordance with the invention allows, relative to the configuration of comparative example 2:
a reduction of the mass consumption of water of 37%
a 9.4% reduction in the mass consumption of concentrated sulfuric acid
a 25% reduction in the mass of spent waters to be treated.

In conclusion, these examples demonstrate that the invention allows very significant energy/starting material savings, with great implementation flexibility. In addition, the modification induced on the facility remains modest and easy to implement, with the addition of pipes equipped, where appropriate, with means for varying the flow rate, for measuring the pH or the temperatures, these additional pipes remaining in their conception entirely within the scope of a person skilled in the art. The invention remains beneficial even if the various operations for treating the biomass (for example the impregnation and cooking and/or steam explosion operation) are not continuous: preference will be given in this case to the recycling of the washing waters to the same feed screw (loop 8b for the washing of the screw 6, loop 13b for the washing of the screw 11).

The invention claimed is:
1. A process for treating a lignocellulosic biomass comprising a solids content of not more than 90% by weight, said process comprising
   feeding the lignocellulosic biomass to an impregnation reactor (9) via a first feeder (6) wherein said first feeder is a plug screw feeder
   increasing the pressure between a biomass inlet and a biomass outlet of the first feeder (6), and
   wherein the second feeder (6) is washed by circulation of a washing fluid between a washing inlet (7) and a washing outlet (8), and
   wherein at least a portion of the washing fluid exiting the washing outlet of the first feeder (6) is reintroduced into the washing inlet (7),
   wherein the process additionally comprises:
   a) preparing an impregnation liquor (4) containing a chemical catalyst (2) suitable for impregnation of the lignocellulosic biomass (5), wherein the chemical catalyst (2) is an acid catalyst, a basic catalyst or an oxidizing catalyst, in a preparation zone (3),
   b) introducing the lignocellulosic biomass (5), which is milled, via an inlet of the impregnation reactor (9) by the first feeder (6), the first feeder being washed by circulation of a first washing fluid between an inlet and an outlet of the first feeder (6),
   c) introducing the impregnation liquor into the impregnation reactor (9) via a first impregnation liquor inlet of the impregnation reactor (9),
   d) draining and transferring the resultant impregnated biomass (10), from an impregnation reactor outlet to an inlet of a cooking pretreatment reactor (14), the introduction into the cooking reactor (14), which is a cooking pretreatment reactor, and which is a steam explosion reactor, taking place via a second feeder (11), the second feeder (11) being washed by circulation of a second washing fluid between an inlet and an outlet of the second feeder (11),
   e) pretreating the biomass (10) in the cooking reactor (14), which is,
   f) reintroducing at least a portion of the first and/or of the second washing fluid leaving the fluid outlet of said first or of said second feeder (6), (11) into a washing inlet of the first feeder (6) and/or of the second feeder (11).
2. The process as claimed in claim 1, wherein a liquid is extracted from the lignocellulosic biomass during its passage through the first feeder (6).
3. The process as claimed in claim 1, wherein the pressure increase created in the first feeder (6) is at least 0.05 MPa.
4. The process as claimed in claim 1, further comprising a step of impregnating the lignocellulosic biomass with an impregnation liquor containing a chemical catalyst, which is performed by introducing the biomass into the reactor (9).
5. The process as claimed in claim 1, further comprising a step of impregnating the lignocellulosic biomass with the impregnation liquor containing the chemical catalyst by passing the lignocellulosic biomass through a bed of impregnation liquor or alternatively by spraying the lignocellulosic biomass with the impregnation liquor on a conveyor of belt type or alternatively by passing the lignocellulosic biomass through a stirred reactor.

6. The process as claimed in claim 1, further comprising a step of impregnating the lignocellulosic biomass with the impregnation liquor containing the chemical catalyst by introduction into reactor (9) via feeder (6).
7. The process as claimed in claim 1, further comprising a step of treating the lignocellulosic biomass by cooking in the cooking reactor (14).
8. The process as claimed in claim 1, further comprising
   g) reintroducing a portion of the first and/or of the second washing fluid leaving the outlet of the first or of the second feeder (6), (11) into an impregnation liquor preparation zone (3).
9. The process as claimed in claim 1, wherein the first feeder (6) is a plug-screw feeder, which is at least partly conical, comprising a cowling equipped with a grate allowing circulation of a washing fluid and optionally extraction of a fluid from the lignocellulosic biomass.
10. The process as claimed in claim 1, wherein a portion of the first washing fluid at a washing outlet of the first feeder (6) is reintroduced into a washing inlet of the first or of the second feeder, and another portion of said washing fluid is reintroduced into the liquor preparation zone (3).
11. The process as claimed in claim 1, wherein a portion of the second washing fluid at a washing outlet of the second feeder (11) is reintroduced into a washing inlet of the first or of the second feeder (6), (11), and another portion of said washing fluid is reintroduced into the liquor preparation zone (3).
12. The process as claimed in claim 1, wherein washing fluid leaving a washing outlet of the first feeder (6) contains catalyst when the biomass undergoes a liquid extraction by passing through the first feeder (6) and said washing fluid containing the catalyst is at least partly reintroduced into the washing inlet of the first feeder (6) wherein the lignocellulosic biomass as a result of the liquid extraction becomes free of catalyst.
13. A process according to claim 1, which is performed in a facility, wherein said facility comprises at least one reactor for treating a lignocellulosic biomass having a solids content of not more than 90% by weight with feeding of the at least one reactor with lignocellulosic biomass via the first feeder creating a pressure increase between the biomass inlet and the biomass outlet of said feeder, with washing of said feeder by circulation of a washing fluid between a washing inlet and a washing outlet, and a line for reintroducing at least a portion of the washing fluid exiting the washing outlet of the feeder into the washing inlet of the same feeder or of another feeder.
14. The process of claim 13, wherein the facility for treating a lignocellulosic biomass comprises:
   a zone (3) for preparing the impregnation liquor (4) containing the chemical catalyst for the impregnation of the lignocellulosic biomass (5), wherein the chemical catalyst is an acid, basic or oxidizing catalyst, and equipped with a liquor outlet,
   the impregnation reactor (9), wherein the impregnation reactor (9) is equipped with a biomass inlet and outlet,
   the first feeder (6) for feeding the lignocellulosic biomass, which is a milled biomass, to the impregnation reactor (9) via the biomass inlet of the impregnation reactor,
   a feeder for feeding impregnation liquor (4a) to the reactor (9) connecting a liquor outlet of a liquor preparation zone (3) to a first liquor inlet in the impregnation reactor,
   the cooking reactor (14) for pretreatment of the lignocellulosic biomass, which is impregnated biomass (10), by cooking, a biomass inlet of cooking reactor (14) being connected to the biomass outlet of the impregnation reactor (9), the second feeder (11) for feeding the lignocellulosic biomass, which is impregnated biomass (10), to the pretreatment reactor via the biomass inlet of cooking reactor (14)

a circulation of washing fluid between an inlet and an outlet of the first feeder (6) of the impregnation reactor (9), a circulation of washing fluid between an inlet and an outlet of the second feeder (11) of the cooking reactor (14), a line for reintroducing at least a portion of the first and/or of the second washing fluid leaving the fluid outlet of said first or of said second feeder (6), (11) into the washing inlet of the first feeder and/or of the second feeder.

15. The process as claimed in claim 1, wherein the lignocellulosic biomass (5) is selected from the group consisting of wood, straw, agricultural residues, dedicated energy crops, annual plants, perennial plants and *miscanthus*.

16. The process as claimed in claim 1, which produces sugars, biofuels or biobased molecules in a presence of a catalyst.

17. The process as claimed in claim 1, wherein the first feeder (6) is a plug-screw feeder, which is at least partly conical, and comprises a cowling equipped with a grate allowing circulation of the washing fluid.

18. The process as claimed in claim 1, additionally comprising a step of impregnating the lignocellulosic biomass that is separate from the feeding step.

19. The process as claimed in claim 1, wherein the pressure increase created in the first feeder (6), is 0.05 to 4 MPa.

20. A process for treating a lignocellulosic biomass comprising a solids content of not more than 90% by weight, said process comprising feeding the lignocellulosic biomass to both an impregnation (9) and feeding an impregnated biomass to a cooking reactor (14) via feeders (6) and (11) respectively wherein feeders (6) and (11) are a plug-screw feeder, and and increasing the pressure between a biomass inlet and a biomass outlet of the feeders (6) and (11), wherein the feeders (6) and (11) are both washed by circulation of washing fluid between washing inlets (7) and (12) and washing outlets (8) and (13) respectively, and wherein at least a portion of the washing fluid exiting the washing outlet of the feeder (6) is reintroduced into the washing inlet (7) or (12) and at least a portion of the washing fluid exiting the washing outlet of the feeder (11) is reintroduced into the washing inlet (7) or (12).

* * * * *